United States Patent Office 2,802,871
Patented Aug. 13, 1957

2,802,871

PREPARATION OF DISULFIDES OF HYDROXY BUTYRIC ACID AND DERIVATIVES THEREOF

Constantine E. Anagnostopoulos, Waltham, and Robert J. Wineman, Concord, Mass., assignors to Monsanto Chemical Company, St. Louis, Mo., a corporation of Delaware No Drawing. Application November 2, 1953, Serial No. 389,837

5 Claims. (Cl. 260—535)

The present invention relates to novel hydroxy butyric acids containing disulfide groups, and derivatives of such acids, and to methods of preparing such compounds. More particularly the invention relates to the preparation of bis-gamma (alpha-hydroxy butyric acid) disulfide and its derivatives.

It is a primary object of the invention to provide disulfides of hydroxy butyric acids, and derivatives thereof, which are highly useful as additives to poultry feed compositions to promote growth or for the purpose of increasing the effective utilization of the feed by the poultry.

Still further objects and advantages of the invention will become apparent from the following description and appended claims.

The preparation of the disulfides of hydroxy butyric acids of the present invention can be exemplified by the process of preparing bis-gamma (alpha-hydroxy butyric acid) disulfide and its alkaline earth metal salts. The process is in general carried out by reacting hydrocyanic acid with beta-acetylthiopropionaldehyde in the presence of a basic catalyst. Preferably an excess of the hydrocyanic acid is added to the propionaldehyde in the presence of about 1% catalyst. The resulting cyanohydrin is treated directly with sulfuric acid, which hydrolyzes the cyanohydrin to the corresponding alpha-hydroxy acid and at the same time hydrolyzes the acetylthio grouping to form alpha-hydroxy gamma-mercapto butyric acid and acetic acid. The reaction mixture is then heated, preferably at some temperature between 80° and 110° C., and finally neutralized with an excess of calcium hydroxide or other alkaline earth metal hydroxide, such as barium or magnesium hydroxide. This produces a thick precipitate, which in the case of calcium hydroxide, is mostly calcium sulfate.

Upon removing the precipitate by filtration the remaining clear filtrate is usually alkaline. If the solution is not alkaline, additional alkali or base, such as ammonia, alkali metal hydroxide or alkaline earth metal hydroxide is added to raise the pH to preferably 8 or above. The solution is then treated with an oxidizing agent to convert the alpha-hydroxy-gamma-mercapto butyric acid salt to the corresponding disulfide. Sufficient oxidant is used to convert completely the mercapto group present to the corresponding disulfide. The solution is then evaporated to a smaller volume (preferably a quarter or less of its original volume) and is then cooled to precipitate the calcium or other alkaline earth metal salt of the disulfide of hydroxy butyric acid. When calcium hydroxide is used, the salt obtained is the calcium salt of bis-gamma (alpha-hydroxy butyric acid) disulfide, which is the calcium salt of the alpha-hydroxy analogue of homocystine.

The oxidation of the hydroxy mercapto butyric acid salt to the disulfide as described above can be carried out with various mild oxidizing agents, such as for example, air, oxygen, iodine, ferric chloride, hydrogen peroxide and the like. Completion of the oxidation may suitably be determined by removing portions of the solution at suitable intervals as the oxidation progresses, acidifying these portions, and adding aqueous iodine solution dropwise. When the iodine color in the first drop persists, the oxidation is complete.

The bis-gamma (alpha-hydroxy butyric acid) disulfide can be obtained as the free acid by a variation of the above procedure, in accordance with which the reaction mixture resulting from the oxidation instead of being evaporated to a smaller volume is acidified with mineral acid, such as hydrochloric acid, sulfuric acid and the like, and then extracted with ether or other water-immiscible organic solvent, such as chloroform, di-n-butyl ether, and the like, after which the solvent layer is separated and the solvent is evaporated. The residue thus obtained is bis-gamma (alpha-hydroxy butyric acid) disulfide.

In addition to the calcium salt of the above disulfide of hydroxy butyric acid, it is also possible to prepare the ammonium and alkali metal salts, including for example the sodium and potassium salts. These may be prepared by careful neutralization of the acid, or solution of the acid, with ammonia or suitable alkali metal hydroxide.

The various compounds prepared as described above, and otherwise forming a part of this invention, may be represented by the general formula:

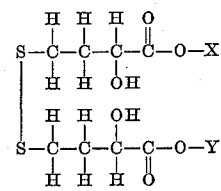

where X and Y represent —H, —NH₄, —alkali metal, —alkaline earth metal—OH, and X and Y together represent alkaline earth metal. The salts so prepared are crystalline solids which are soluble in hot water, but not soluble in the usual organic solvents. The free acid is a viscous liquid, which is soluble in water and in certain organic solvents, such as ethyl alcohol, diethyl ether, acetone and the like. All of these compounds are useful in poultry feeds when added in quantities between 0.005 and 1.0% by weight, based on the feed or ration, to promote the growth of the poultry and/or to improve the efficiency of feed utilization by the poultry. The amounts employed within this range are dependent on the particular poultry feed compositions used. The compounds are also useful as intermediates in the preparation of other organic compounds.

A further understanding of the compounds and processes of this invention will be obtained from the following examples, parts and percentages being by weight unless otherwise specified.

EXAMPLE I

Preparation of the calcium salt of bis-gamma(alpha-hydroxy butyric acid) disulfide Twenty-five and two-tenths grams (0.945 mols) of hydrocyanic acid were added to a well-stirred mixture of 100 grams (0.9 mols) of beta-acetylthiopropionaldehyde (boiling point 92 to 93° C. at a pressure of 14 mm. of Hg) and 1 gram of pyridine. The addition took 45 minutes and the reaction mixture was kept between 30 and 40° C. by continuous external cooling. Stirring was continued for an additional 30 minutes, after which time the excess of hydrocyanic acid was removed by the application of an absolute pressure of 25 mm. of Hg.

The resulting cyanohydrin was directly hydrolyzed by the slow addition of a mixture of 124 grams of concentrated (97%) sulfuric acid and 92 ml. of water. The reaction mixture was kept at about 35 to 40° C. by external cooling. Sufficient water (400 grams) was then added to make a 20 to 25% aqueous sulfuric acid solution which was thereupon heated at 80° C. for 2 hours.

The resulting solution was cooled to room temperature and 148 grams (2 mols) of calcium hydroxide were added to precipitate all the sulfate ions present as calcium sulfate. After filtering off the resulting precipitate, 50 ml. of concentrated aqueous ammonia were added to the clear filtrate. Oxygen was then bubbled through the solution, which was kept at 40° C., until a 2 ml. portion acidified with acetic acid no longer decolorized 0.05 ml. of 0.1 N aqueous iodine solution. This took about 3 hours. The solution was then evaporated to one-eighth of its original volume and on cooling the calcium salt of bis-gamma (alpha-hydroxy butyric acid) disulfide precipitated in well-formed crystals and was separated by filtration.

A molecular weight determination by the micro-Rast method using camphene gave a value of 286 (calculated molecular weight: 308.38). Calculated on the basis of the formula $C_8H_{12}O_8S_2Ca$; C=31.15%, H=3.92%, S=20.79%, Ca=12.99% and O=31.15%. Found by analysis; C=30.78%, H=4.08%, S=20.8%, Ca=13.00% and O=31.56% (by difference).

*Example II*

*Preparation of bis-gamma (alpha-hydroxy butyric acid) disulfide.*

The reactions were carried out as described in Example I up to and including the step where oxygen is bubbled through the solution for 3 hours. Then instead of evaporating the solution to a small volume, the solution was brought to a pH of 1 by the addition of hydrochloric acid (35%) and extracted with five portions of 500 ml. each of ether. The combined ethereal extracts were washed once with 500 ml. of water, dried over anhydrous sodium sulfate and evaporated under an absolute pressure of 25 mm. of Hg. The viscous liquid residue thus obtained was bis-gamma (alpha-hydroxy butyric acid) disulfide. Titration of a portion with 0.1 N sodium hydroxide gave a neutralization equivalent of 260 (calculated neutralization equivalent: 268.30).

The identity of the free butyric acid disulfide was further confirmed by converting it to the calcium salt in the following manner. To a solution of 2.68 grams of the viscous liquid obtained as described above in 20 ml. of water, 2 grams of calcium hydroxide were added. The mixture was heated to 80° C. and then cooled to room temperature. The excess calcium hydroxide was then filtered off, and the filtrate treated with decolorizing charcoal and evaporated to a volume of 5 ml. by boiling off the excess water at atmospheric pressure. Upon cooling to 5° C. a crystalline precipitate was formed, which was found to be identical with the calcium salt of bis-gamma (alpha-hydroxy butyric acid) disulfide obtained according to Example I by comparison of the infra red spectra.

What is claimed is:

1. A chemical compound having the general formula:

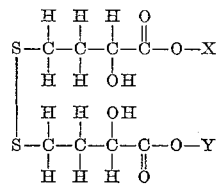

where X and Y are radicals selected from the group consisting of —H, —NH$_4$, -alkali metal, —O½R, wherein R is alkaline earth metal, and X and Y together represent -alkaline earth metal.

2. A chemical compound having the formula:

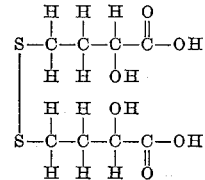

3. A chemical compound having the formula:

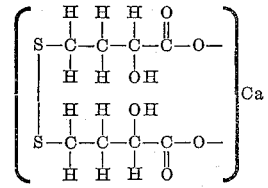

4. The method of preparing the calcium salt of bis-gamma (alpha-hydroxy butyric acid) disulfide which comprises reacting hydrocyanic acid with beta-acetylthiopropionaldehyde in the presence of a basic catalyst, hydrolyzing the resulting cyanohydrin with sulfuric acid, heating the reaction mixture at a temperature between 80° and 110° C., neutralizing it with an excess of calcium hydroxide, filtering off the precipitated calcium sulfate, adding sufficient oxidizing agent to the resulting alkaline solution to completely convert the mercapto group present to the corresponding disulfide, then evaporating the solution to a volume not more than one-quarter of its original volume, and allowing the solution to cool, whereby a precipitate is formed.

5. The method of preparing bis-gamma (alpha-hydroxy butyric acid) disulfide which comprises reacting hydrocyanic acid with beta-acetylthiopropionaldehyde in the presence of a basic catalyst, hydrolyzing the resulting cyanohydrin with sulfuric acid, heating the reaction mixture at a temperature between 80° and 110° C., neutralizing it with an excess of calcium hydroxide, filtering off the precipitated calcium sulfate, adding sufficient oxidizing agent to the resulting alkaline solution to completely convert the mercapto group present to the corresponding disulfide, then acidifying the solution with mineral acid, extracting it with a water-immiscible organic solvent, separating the solvent layer and evaporating the solvent.

References Cited in the file of this patent

Koelsch: Jour. Amer. Chem. Soc., vol. 52, pp. 1105-8 (1930).

Greenberg: Amino Acids and Proteins, Charles C. Thomas, publisher, Springfield, Ill., 1951, pp. 595-6.